United States Patent Office 2,790,833
Patented Apr. 30, 1957

2,790,833

METHOD OF PREPARING ARYL POLYSULFIDES

Chien-wei Liao, Cleveland, Ohio, assignor to The Standard Oil Company, Cleveland, Ohio, a corporation of Ohio No Drawing. Application September 13, 1954,
Serial No. 455,748

10 Claims. (Cl. 260—608)

The present invention relates to a method of preparing aryl polysulfides.

Aryl polysulfides, particularly polysulfides containing two or more benzyl nuclei and three or more sulfur atoms in each sulfur bridge and having alkyl substituents on the benzyl nuclei, have been found to be particularly valuable as cutting oil concentrates. Proposals, such as that made in co-pending application Serial No. 455,747, filed September 13, 1954, to react aryl halides with an alkali metal polysulfide have left something to be desired, even when the reaction is carried out with excess alkali metal polysulfide and in the presence of an inert hydrocarbon diluent such as gas oil. Thus, for example, in the reaction of a trimethylbenzyl halide and a trimethylxylylene dihalide with excess alkali metal tetrasulfide, considerable difficulty is experienced in obtaining an organic polysulfide product in which the number of sulfur atoms in the sulfur bridge or bridges averages four. This difficulty is apparently caused by one or more side reactions, such as self-condensation of the xylylene dihalide, at the elevated temperature required to effect a reaction. Furthermore, attempts to increase the number of sulfur atoms in the sulfur bridge or bridges to about five by reaction of the organic polysulfide with elemental sulfur have not been entirely satisfactory.

The surprising and unexpected discovery has now been made that it is feasible to prepare aryl polysulfides of appreciably higher sulfur content, lower viscosity, improved solubility, and in better yield than has hitherto proved possible by adding an aryl halide to a stoichiometric excess of an alkali metal sulfide at a rate not exceeding substantially the rate of reaction of the aryl halide with the alkali metal sulfide at the temperature employed. The reaction product may thereafter be reacted with elemental sulfur to increase the sulfur content still further or, if desired, the aryl halide may be reacted simultaneously with alkali metal sulfide and elemental sulfur. It is preferred, in the method of this invention, to add a mixture of aryl mono- and dihalides, present in a molal ratio greater than 2:1, at the rate indicated to a mixture of alkali metal polysulfide and hydrocarbon diluent which has been preheated to an elevated temperature of at least about 160° F. and desirably above 180° F.

In one embodiment of the method of the invention, a mixture containing one or more alkyl-substituted benzyl monohalides and one or more alkyl-substituted xylylene dihalides is slowly added to a mixture of an alkali metal polysulfide and hydrocarbon diluent preheated to an elevated temperature of about 160° F. or higher and preferably of the order of about 200° F., the rate of addition of the mono- and dihalides being slow enough to reduce to a minimum side reactions such as a reaction of the dihalides with themselves to form aryl methane-type compounds, which are of no value as cutting oil additives, reduce the yield of polysulfide, and increase the viscosity of the product. The organic polysulfides thus obtained, which contain an average of very close to four sulfur atoms in each sulfur bridge, are highly useful as cutting oil concentrates and are capable of reaction with elemental sulfur to form stable products containing an average of very close to five sulfur atoms per sulfur bridge.

The reaction which takes place proceeds as follows:

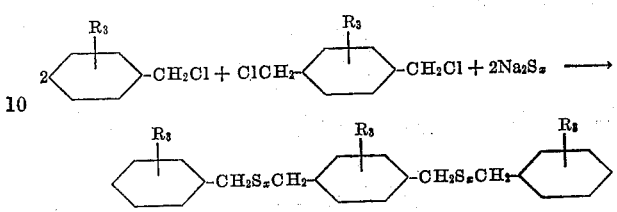

According to the above equation, two moles of the monochloro alkaryl compound and one mole of the dichloro alkaryl compound react with two moles of the polysulfide to produce the trimer, containing two benzyl radicals and one xylyl radical per molecule. This product is referred to herein as the xylylene di-tetrasulfide or the trimer. The R stands for alkyl radicals, and $x$ is the same on each side of the equation and has a value of at least three, and preferably four to five. The alkyl-substituted benzyl radical has a total of at least seven up to ten carbon atoms, and the alkyl-substituted xylylene radical has a total of at least eight up to eleven carbon atoms.

The term "stoichiometric excess" as used herein is with reference to the amount of alkali metal polysulfide in accordance with the above reaction equation to produce a trimer wherein $x$ is the same in the polysulfide and in the trimer and ranges from three to five.

In accordance with an embodiment of the method of the invention that is preferred because of the ready availability of the starting material, a catalytic reformate containing primarily the various isomers of trimethylbenzene and methylethylbenzene, as well as some propylbenzenes and less heavily substituted alkylbenzenes, is chloromethylated by any suitable means such as, for example, by reaction with formaldehyde, or a formaldehyde engendering material, and HCl in the form of hydrochloric acid, hydrogen chloride gas, or both, for from about two to about seven hours at temperatures of the order of about 150° F. This reaction is advantageously carried out while stirring the reactants under a reflux and, after the reaction is complete, cooling the reaction mixture to room temperature, separating the two immiscible phases, washing the oily layer with water and separating the aqueous phase, washing the layer with sodium carbonate solution until the products are neutral, separating the layers, washing the products again with water and separating the layers, and finally drying the products with anhydrous calcium chloride. The organic reaction product thus obtained is essentially a mixture of alkyl-substituted xylylene dichlorides having a total of eleven carbon atoms, i. e., primarily the various isomers of trimethylxylylene dichloride

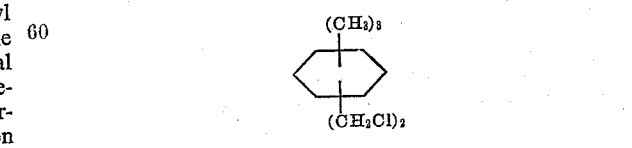

as well as some methylethylxylylene dichloride

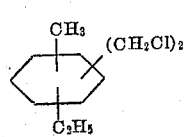

and propylxylene dichloride

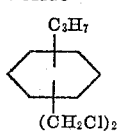

and of alkyl-substituted benzyl monochlorides having a total of ten carbon atoms, i. e., primarily the various isomers of trimethylbenzyl monochloride

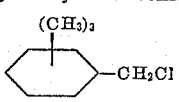

as well as some methylethylbenzyl monochloride

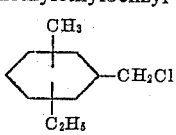

and propylbenzyl monochloride

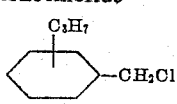

Under the conditions described, the molal ratio of the benzyl monochlorides by the xylylene dichlorides is normally at least about 3:1. Lower ratios, e. g., 2.88:1, have however been obtained with the same starting material by using a considerable excess of HCl in the form of a gas in the chloromethylation.

The mixture of benzyl monochlorides and xylylene dischlorides obtained in this manner, or any combination of alkyl-substituted benzyl monohalides and xylylene dihalides preferably containing ten and eleven carbon atoms, respectively, from any other source, the mono- and dichloride being present in a molal ratio greater than 2:1 and preferably about 3:1, is then added slowly to a mixture, preheated to an elevated temperature of the order of about 200° F., of a stoichiometric excess of sodium tetrasulfide, in the form of an aqueous solution, with a hydrocarbon diluent. To promote completion of the desired reaction and avoid undesirable side reactions, such as self-condensation of unreacted chloride molecules at the reaction temperature, the stoichiometric excess of the total amount of alkali metal tetrasulfide used should be at least about 10% and preferably of the order of about 30%.

The rate of addition varies with the rate at which the chlorides react with the sodium tetrasulfide under the particular temperature conditions and is one selected to preclude the presence of a substantial amount of unreacted chlorides in the mixture at any time. The chlorides are added either incrementally or continuously, continuous additions being preferred. When adding the chlorides in increments during the reaction period, it is desirable to have the increments as small as possible in order to most closely approach continuous addition. There should be at least about four and preferably six or more incremental additions at substantially equal intervals within a total reaction time, under the conditions of the preferred embodiment herein described, ranging between about one and about four hours. Lower rates of addition are operable and in fact necessary at lower temperatures but are not as desirable from the standpoint of efficiency and economy of operation.

The reaction mixture is maintained at about 200° F. for several hours, the reaction preferably being carried out with agitation under an inert atmosphere such as nitrogen. Upon cooling the reaction mixture to about 110 to 125° F. and settling, the reaction mixture forms an organic phase and an aqueous phase. The aqueous phase is separated and the remainder, i. e., the organic phase, is washed with alkali metal hydroxide solution by stirring for about one-half hour at 110 to 120° F. and, if desired, treated with a mineral adsorbent. Upon separation of the alkali hydroxide solution, high yields are obtained of a composition comprising mixed polysulfides having the general formula R—$S_x$—R and $$R-S_x-R'-S_x-R$$

in which the R's stand for alkyl-substituted benzyl radicals having ten carbon atoms, R' stands for an alkyl-substituted xylylene radical having eleven carbon atoms, and $x$ is an average of at least about 3 and generally about 4. For convenience, these compounds are referred to herein as the benzyl disulfides and the xylylene di-tetrasulfides or the trimers, respectively. The composition contains primarily the xylylene di-tetrasulfides or the trimers.

Tests have shown that when the benzyl monochlorides and xylylene dichlorides are present in the mixtures reacted with sodium tetrasulfide in a ratio of 2:1 or less, the resulting products are insoluble in mineral cutting oil bases and presumably have a long chain, polymer structure.

The reaction is thought to proceed as follows:

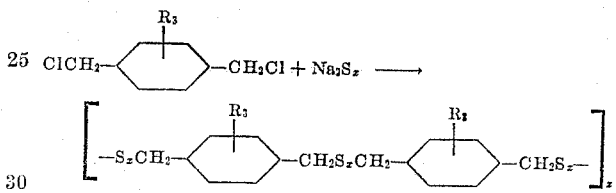

It is believed, therefore, that the monochlorides act as chain stoppers in avoiding the formation of such polymers and promoting the formation of trimers and that monochlorides in excess of the 2:1 molal ratio form the corresponding alkyl-substituted benzyl polysulfides or dimers in accordance with the following equation:

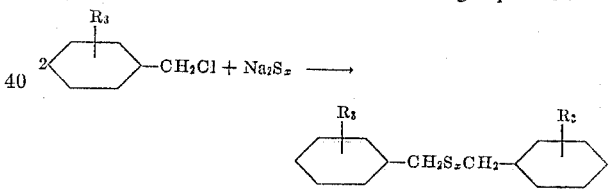

The dimers act as diluents for the trimers. The oil-soluble organic products of reaction with sodium tetrasulfide are probably mixtures of one or more of the described xylylene di-tetrasulfides R—$S_x$—R'—$S_x$—R with alkyl-substituted benzyl tetrasulfides R—$S_x$—R. When the molal ratio of monochlorides to dichlorides reacted with sodium tetrasulfide is about 3:1, the molal ratio of the xylylene di-tetrasulfides to the benzyl tetrasulfides is about 2:1.

The hydrocarbon diluent utilized in the reaction is preferably one having a low viscosity, a high flash point and a boiling point in the kerosene and fuel oil boiling ranges. Hydrocarbon fractions generally designated as gas oil are particularly suitable for this purpose. The addition of gas oil or fuel oil, which does not react with either the reactants, the alkyl-substituted xylylene and benzyl tetrasulfides or the ultimately desired alkyl-substituted xylylene and benzyl pentasulfides, has the highly desirable and purely physical functions of imparting to the mixtures thereof lower viscosities than either the tetrasulfides or the pentasulfides per se, facilitating the handling of the reactants and the products, and aiding in the separation of any aqueous phase after the reaction. Alkyl-substituted benzenes having boiling points above about 300° F., such as any that may be unreacted in the chloromethylation described are, like the dimers, also, eminently suitable as diluents. The diluent remains with the organic phase and serves as such in the succeeding reaction step with elemental sulfur.

The tetrasulfides obtained by reaction of the benzyl monochlorides and xylylene dichlorides with sodium polysulfide are then reacted, preferably under an inert atmosphere such as nitrogen and while remaining in the presence of the diluent, with an excess, preferably about 5%, of elemental sulfur for two to three hours at a temperature between about 200° F. and about 300° F., preferably about 240° F., to form the corresponding pentasulfides, so referred to herein because they contain an average of close to five sulfur atoms between adjacent aryl groups.

It is to be understood, of course, that it is within the scope of the invention to prepare any one or a selected combination of alkyl-substituted xylylene dipolysulfides of the general formula R—S$_x$—R'—S$_x$—R in which the R's stand for alkyl-substituted benzyl radicals having a total of up to ten, i. e., at least seven and preferably ten carbon atoms, R' is an alkyl-substituted xylylene radical having a total of up to eleven, i. e., at least eight and preferably eleven carbon atoms, and $x$ is at least 3 and preferably 4 to 5, by appropriate selection of the corresponding starting materials, or by separation thereof from a mixture of polysulfides with the aid of a selective solvent such as 2-methyl-2,4-pentanediol, pentane, isopropanol, amyl alcohol, and the like. It is also within the scope of the invention to prepare compositions containing such alkyl-substituted xylylene di-polysulfide or polysulfides in combination with any one or a selected combination of alkyl-substituted benzyl polysulfides.

Concentrates prepared by this method and containing as little as about 10% or less, and as much as 50 to 70%, alkyl-substituted xylylene di-polysulfide in alkyl-substituted benzyl polysulfide or hydrocarbon diluents such as gas oil have superior cutting ability, transparency and excellent odor characteristics even without being blended with a cutting oil base. The polysulfide content of the concentrate may be entirely alkyl-substituted xylylene di-polysulfide or it may be an admixture of as little as about one mol of the di-polysulfide, i. e., the trimer, to nine mols of alkyl-substituted benzyl polysulfide, i. e., the dimer. Molal proportions of trimer to dimer in the ratio of about 2:1, obtained by reacting alkyl-substituted benzyl monohalide and alkyl-substituted xylylene dihalide in proportions of about 3:1 with an alkali metal polysulfide and elemental sulfur are preferred.

Both the tetra- and pentasulfides prepared in accordance with the invention, diluted or not with a suitable hydrocarbon diluent such as gas oil, and admixed or not with alkyl-substituted benzyl tetra- or penta-sulfides, may be blended to form stable and clear solutions with any mineral cutting oil base having a viscosity between about 75 and 300 SSU at 100° F. The cutting oil base may be a neutral stock (unrefined) which may or may not be inhibited or may be refined by any conventional process, such as acid treating or solvent extraction. The cutting oil base may contain free elemental sulfur dissolved therein. The lower limit of viscosity specified is imposed largely by sulfur solubility. Oils having viscosities higher than 300 SSU at 100° F. are not preferred because of difficulties of handling and flowing. Cutting oil blends containing as little as 0.5% or less by weight of alkyl-substituted xylylene di-tetrasulfide or di-pentasulfide have excellent cutting ability. The concentrates of the invention and the cutting oil blends containing the concentrates combine this unusually excellent cutting ability with low volatility, ability to stay on the tool and the work at the cutting point even at high temperature, absence of objectionable odor either upon standing or in severe use and ability to form stable blend with cutting oil bases. For cutting operations on ductile steels, sulfurized oil blends containing between about 0.5% and 5% by weight of the concentrate are highly satisfactory.

One of the most important advantages of the method of the invention is that side reactions, such as self-condensation of the xylylene dihalides, is avoided or at least reduced to a minimum. This reduction in side reactions has the important and beneficial advantages of improving the yield of polysulfides substantially, i. e., the order of about 15%, and of reducing the viscosity and increasing the solubility of the polysulfides per se, thus rendering the product more susceptible to easy formulation and consequently more attractive for use.

The advantages and utility of the method of this invention will become more apparent from the following example illustrating the invention.

EXAMPLE

Part A.—120 grams of "Solvesso 100," a catalytic reformate comprising a mixture of aromatic hydrocarbons containing approximately 39% by weight trimethylbenzene isomers, 36% by weight methylethylbenzene isomers, 3% isopropylbenzene isomers and minor amounts of m-xylene, o-xylene, p-xylene and unidentified monoalkylbenzenes probably including propylbenzene isomers, were refluxed at 140 to 158° F. for seven hours under a water condenser while stirring the reactants with 446 ml. 36% aqueous hydrochloric acid and 42.8 grams of 91% paraformaldehyde in the form of flakes. During the reaction a slow stream of HCl gas was fed to the reaction mixture and care was taken to provide good ventilation. After seven hours, the reaction mixture was cooled to room temperature and allowed to settle into two immiscible layers, the lower aqueous layer was separated, the upper oily layer was washed with water then washed with a 5% aqueous sodium carbonate solution until neutral and then washed again and finally dried with anhydrous calcium chloride. The dried product weighed 162.2 grams. 56% by weight of the final oily phase was found to be a mixture of alkyl-substituted benzyl monochlorides, i. e., primarily trimethylbenzyl monochlorides

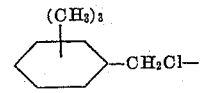

and methylethylbenzyl monochlorides

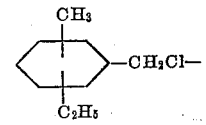

22% was found to be a mixture of alkyl-substituted xylylene dichlorides, i. e., primarily trimethyl- and methylethylxylylene dichlorides

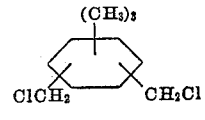

and

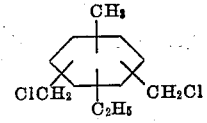

respectively, which is approximately a 3:1 mol ratio, and the remaining 22% was found to be substantially unreacted.

Part B.—162.2 grams of the dried reaction products of Part A, including the unreacted "Solvesso 100," were slowly added to a mixture, preheated to 200° F., of 244 grams of a 40% aqueous solution of sodium tetrasulfide and 64.3 grams of a gas oil having a viscosity of 42 SSU at 100° F. and a flash point at 275° F. The chlorides were added over a period of one to two hours (at a rate at which gentle refluxing is maintained). The mixture was subjected to reflux at 200° F. for about five to six hours while stirring well. The reaction mixture was then cooled to about 110–120° F. and allowed to settle, the aqueous phase was separated, the remaining organic phase was treated with about 20% by volume of a 3% aqueous sodium hydroxide solution and stirred for thirty minutes at 110–120° F., the caustic then being separated. Thereupon, 7.5 grams (3% by weight) Super Filtrol, a mineral adsorbent, was added and the mixture stirred for about ten minutes at 110–120° F. The mixture was then filtered to yield 242 grams of a mixture believed to comprise essentially 60% by weight alkyl-substituted xylylene di-tetrasulfides primarily of the formulae

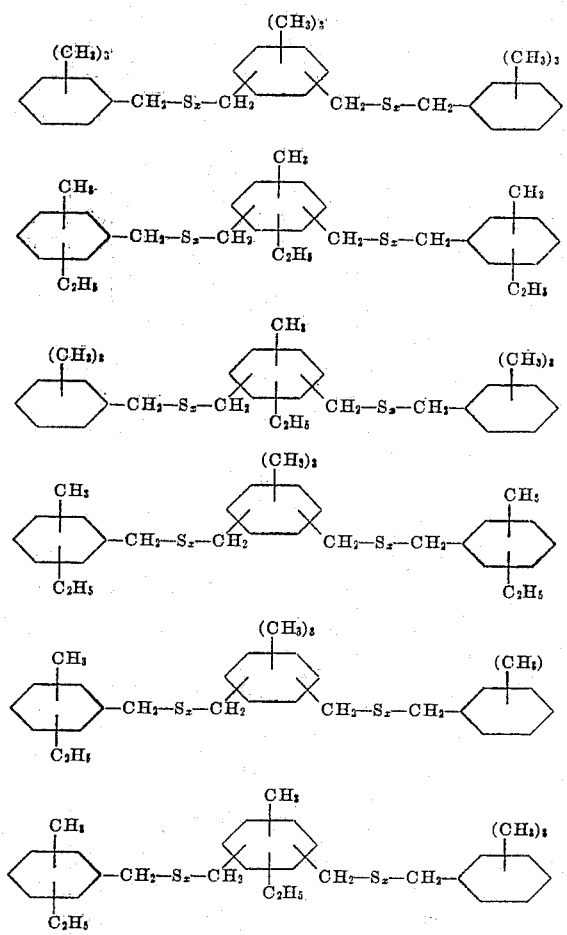

and alkyl-substituted benzyl tetrasulfides primarily of the formulae

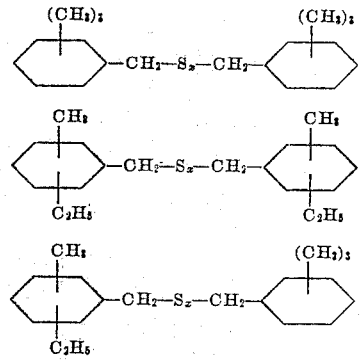

in which $x$ is an average of approximately 4.

This concentrate was found, upon analysis, to have a total sulfur content of 21.3% and an active sulfur content of 10.6%, indicating that the sulfur bridges in the tetrasulfides contain an average of approximately four sulfur atoms.

*Part C.*—242 grams of the 60% concentrate prepared in accordance with Part B of the example were admixed and heated to 240° F. with 12.85 grams of elemental sulfur and maintained at that temperature for two hours under nitrogen atmosphere, with good stirring.

The total sulfur content of the 60/40 polysulfide-gas oil concentrate was 25.1% and the active sulfur content was 14.6%, indicating that the sulfur bridges contain an average of approximately five sulfur atoms. The total sulfur content also indicates a yield of approximately 100% of the polysulfide based on the chlorides.

*Part D.*—A cutting oil base was prepared by adding to Diamond Paraffin oil, an acid-treated lubricating oil stock having a viscosity of 100 SSU at 100° F., 0.8% by weight elemental sulfur, i. e., the maximum amount of sulfur soluble in the oil at 0° C. The mixture was heated and stirred at 200° F. until all of the sulfur was dissolved. This took approximately one to two hours.

Blends of the cutting oil base with 0.5 to 5% by weight of the 60/40 concentrate prepared in Part B of the example and with 0.5 to 5% by weight of the 60/40 concentrate prepared in Part C of the example form excellent cutting oils characterized by remarkable cutting ability, low volatility and absence of odor, light color, transparency, and ability to remain on the work and the tool at the point of cut.

A blend of the cutting oil base with 1% by volume of the 60/40 concentrate, 4% lard oil and 0.5% "Aroclor 1254," a chlorinated biphenyl available as a yellow-tinted, viscous oil having a chlorine content of 54%, a specific gravity between 1.538 and 1.548 and a distillation range of 365–390° C., said cutting oil having a total active sulfur content of approximately 0.9%, was tested in thread-cutting, chamfering, and cut-off operations.

In the thread-cutting operation, tie rods were made from C–1022 steel forgings. The finish was taken as the criterion of tool life, which was considered an end when either tearing of the thread flank and crest or chip welding at the root of the chaser land occurred. In these tests, as many as 2100 tie rods were threaded before tool failure.

In the chamfering and cut-off operation, ductile C–1010 steel was used. While the best cutting oil heretofore on the market gave a chamfering tool life of ten hours and a cutting tool life of seven hours, the cutting oil of the invention gave good operation for ten hours (the length of the test) with both tools and examination of the work and tools at the end of the tests indicated that continuation of the tests beyond the ten-hour period would have shown the tool life to be considerably longer than ten hours.

It is to be understood that various modifications of the method described herein will readily occur to those skilled in the art. All such modifications are intended to be included within the scope of the invention as defined in the accompanying claims.

I claim:

1. In a method of reacting an alkyl-substituted halomethyl benzene having from seven to eleven carbon atoms with an alkali metal polysulfide having an average of from three to about four sulphur atoms to form a sulfide containing at least two benzyl groups linked through $CH_2$ to the sulfur atoms, the improvement which comprises adding the halomethyl benzene to an amount of the alkali metal sulfide in excess of that stoichiometrically required to form the sulfide, the excess not exceeding 30%, at a temperature of at least about 160° F. up to about 200° F. in the presence of an inert petroleum hydrocarbon diluent, the rate of addition not exceeding substantially the rate of reaction of the halomethyl benzene with the alkali metal sulfide.

2. In a method of reacting an alkyl-substituted chloromethyl benzene having from seven to eleven carbon atoms with a sodium polysulfide having an average of from three to about four sulfur atoms in the presence of an inert petroleum hydrocarbon diluent to form a sulfide containing at least two benzyl groups linked through $CH_2$ to the sulfur atoms, the improvement which comprises adding the chloromethyl benzene to an amount of sodium sulfide in excess of that stoichiometrically required to form the sulfide, the excess not exceeding 30%, and the hydrocarbon diluent at a temperature of at least about 160° F. up to about 200° F., the rate of addition not exceeding substantially the rate of reaction of the chloromethyl benzene with the sodium sulfide.

3. In a method of reacting a mixture of alkyl-substituted mono- and dichloromethyl benzenes having from seven to eleven carbon atoms with sodium tetrasulfide at a temperature of at least about 160° F. up to about 200° F. in the presence of an inert petroleum hydrocarbon diluent to form a di-polysulfide containing two benzyl groups and one xylyl group linked through $CH_2$ to the sulfur atoms, the improvement which comprises adding the chloromethyl benzene to the sodium tetrasulfide and hydrocarbon diluent at a rate not exceeding substantially the rate of reaction of the chloromethyl benzene with the sodium tetrasulfide, the sodium tetrasulfide being present in an amount in excess of that stoichiometrically required to form the sulfide, but the excess not exceeding 30%.

4. In a method of reacting a mixture of alkyl-substituted benzyl monochlorides and alkyl-substituted xylylene dichlorides said monochlorides and dichlorides having from seven to eleven carbon atoms, in which the molal ratio of monochlorides to dichlorides is greater than 2:1, with sodium tetrasulfide at a temperature of about 200° F. in the presence of an inert petroleum hydrocarbon diluent to form a mixture of polysulfides having the general formulae R—$S_x$—R'—$S_x$—R and R—$S_x$—R in which R is an alkyl-substituted benzyl radical having a total of up to ten carbon atoms, R' is an alkyl-substituted xylylene radical having a total of up to eleven carbon atoms, and $x$ is at least about 3 to 4, the improvement which comprises preheating the sodium tetrasulfide and hydrocarbon diluent to said temperature and then continuously admixing the mixture of monochlorides and dichlorides with the preheated sodium tetrasulfide and hydrocarbon diluent at a rate not exceeding substantially the rate of reaction of the chlorides with the tetrasulfide and which will preclude the presence of a substantial amount of unreacted chlorides at any time, the sodium tetrasulfide being present in an amount in excess of that stoichiometrically required to form the sulfide by about 30%.

5. A method which comprises adding a mixture essentially comprising alkyl-substituted benzyl monochlorides and alkyl-substituted xylylene dichlorides said monochlorides and dichlorides having from seven to eleven carbon atoms in a molal ratio greater than 2:1 to a mixture of sodium tetrasulfide and an inert petroleum hydrocarbon diluent preheated to a temperature above about 160° F. up to about 200° F. at a rate not exceeding substantially the rate of reaction of the chlorides with the tetrasulfide to form a mixture essentially comprising a di-polysulfide having the general formula R—$S_x$—R'—$S_x$—R in which R is an alkyl-substituted benzyl radical having a total of up to ten carbon atoms, R' is an alkyl-substituted xylylene radical having a total of up to eleven carbon atoms, and $x$ is at least about 3 to 4, the sodium tetrasulfide being present in an amount in excess of that stoichiometrically required to form the sulfide by at least about 10% the excess not exceeding 30%.

6. A method which comprises adding a mixture essentially comprising trimethylbenzyl monochlorides, methylethylbenzyl monochlorides, trimethylxylylene dichlorides and methylethylxylylene dichlorides said monochlorides and dichlorides having from seven to eleven carbon atoms, the monochlorides and dichlorides being present in a molal ratio of about 3:1, to a mixture of sodium tetrasulfide, present in an amount in excess of that stoichiometrically required to form the sulfide by at least about 10% the excess not exceeding 30%, and an inert petroleum hydrocarbon diluent preheated to a temperature of the order of about 200° F. at a rate not exceeding substantially the rate of reaction of the chlorides with the tetrasulfide to form a mixture essentially comprising a mixture of polysulfides having the general formulae R—$S_x$—R'—$S_x$—R and R—$S_x$—R in which R is a radical selected from the group consisting of trimethylbenzyl and methylethylbenzyl radicals, R' is a radical selected from the group consisting of trimethylxylylene and methylethylxylylene radicals, and $x$ averages between 3 and 4.

7. A method which comprises continuously adding a mixture essentially comprising trimethylbenzyl monochlorides, methylethylbenzyl monochlorides, trimethylxylylene dichlorides and methylethylxylylene dichlorides said monochlorides and dichlorides having from seven to eleven carbon atoms, the monochlorides and dichlorides being present in a molal ratio of about 3:1, to a mixture of sodium tetrasulfide, present in an amount in excess of that stoichiometrically required to form the sulfide by about 30%, and an inert petroleum hydrocarbon diluent preheated to a temperature of the order of about 200° F., at a rate which will preclude the presence of a substantial amount of unreacted chlorides in the reaction mixture at any time, to form a mixture essentially comprising a mixture of polysulfides having the general formulae R—$S_x$—R'—$S_x$—R and R—$S_x$—R in which R is a radical selected from the group consisting of trimethylbenzyl and methylethylbenzyl radicals, R' is a radical selected from the group consisting of trimethylxylylene and methylethylxylylene radicals, and $x$ averages about 4, and then sulfurizing said mixture by admixing it with elemental sulfur and maintaining the resulting mixture at a temperature between about 200° F. and about 300° F. until $x$ averages about 5.

8. A method which comprises adding a mixture essentially comprising trimethylbenzyl monochloride and trimethylxylylene dichloride said monochlorides and dichlorides having from seven to eleven carbon atoms in a molal ratio of about 3:1 to a mixture of an amount of sodium tetrasulfide in excess of that stoichiometrically required to form the sulfide the excess not exceeding 30% and gas oil preheated to a temperature of the order of about 200° F. at a rate not exceeding substantially the rate of reaction of the chlorides with the tetrasulfide to form a mixture essentially comprising

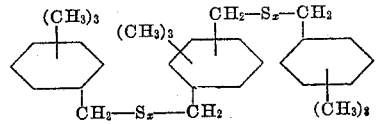

and

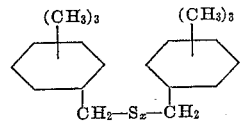

in a mol proportion of about 2:1 and wherein the $x$'s average about 4, and then sulfurizing said mixture by admixing it with elemental sulfur and maintaining the resulting mixture at a temperature of about 240° F. until the $x$'s average about 5.

9. A method which comprises reacting a mixture of aromatic hydrocarbons essentially comprising alkyl-substituted benzenes with formaldehyde and HCl to form a chloromethylated mixture essentially comprising alkyl-substituted benzyl monochlorides and alkyl-substituted xylylene dichlorides said monochlorides and dichlorides having from seven to eleven carbon atoms, and adding said chloromethylated mixture to a mixture of an amount of sodium tetrasulfide in excess of that stoichiometrically required to form the sulfide the excess not exceeding 30%, and an inert petroleum hydrocarbon diluent preheated to a temperature of at least about 160° F. up to about 200° F.

at a rate not exceeding substantially the rate of reaction of the chlorides with the tetrasulfide to form a polysulfide containing at least two alkyl-substituted benzyl radicals.

10. A method which comprises reacting trimethylbenzene with formaldehyde and HCl to form a chloromethylated mixture essentially comprising trimethylbenzyl monochloride and trimethylxylylene chloride, said monochlorides and dichlorides having from seven to eleven carbon atoms, adding said chloromethylated mixture to a mixture of an amount of sodium tetrasulfide in excess of that stoichiometrically required to form the sulfide the excess not exceeding 30% and an inert petroleum hydrocarbon diluent preheated to a temperature of at least about 160° F. up to about 200° F. at a rate not exceeding substantially the rate of reaction of the chlorides with the tetrasulfide to form a mixture essentially comprising the compounds.

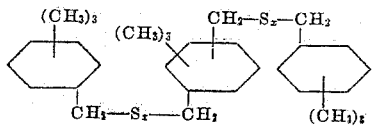

and

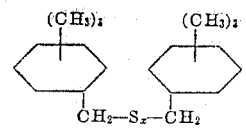

in which the $x$'s average about 4, and then sulfurizing said mixture by admixing it with elemental sulfur and maintaining the resulting mixture at an elevated temperature between about 200° F. and about 300° F. until the $x$'s average about 5.

References Cited in the file of this patent

UNITED STATES PATENTS

| | | |
|---|---|---|
| 2,113,092 | Moran | Apr. 5, 1938 |
| 2,113,093 | Moran | Apr. 5, 1938 |
| 2,185,007 | Wojcik | Dec. 26, 1939 |
| 2,185,008 | Wojcik | Dec. 26, 1939 |
| 2,273,471 | Kimball | Feb. 17, 1942 |
| 2,529,355 | Schulze et al. | Nov. 7, 1950 |